US006705553B2

(12) United States Patent
Drechsel

(10) Patent No.: US 6,705,553 B2
(45) Date of Patent: Mar. 16, 2004

(54) APPARATUS FOR WATERING SURFACES

(76) Inventor: Arno Drechsel, Am Lacherstrasse 12, A-9900 Lienz (AT)

( * ) Notice: Subject to any disclaimer, the term of this patent is extended or adjusted under 35 U.S.C. 154(b) by 122 days.

(21) Appl. No.: 09/900,582

(22) Filed: Jul. 6, 2001

(65) Prior Publication Data

US 2002/0005443 A1 Jan. 17, 2002

(30) Foreign Application Priority Data

Jul. 11, 2000 (AT) .............................................. 1188/00

(51) Int. Cl.[7] .............................................. B05B 3/00
(52) U.S. Cl. .................... 239/728; 239/723; 239/67; 239/74; 239/76
(58) Field of Search .............................. 239/67, 73, 74, 239/76, 728, 723, 726

(56) References Cited

U.S. PATENT DOCUMENTS

| | | | |
|---|---|---|---|
| 4,209,131 A | * | 6/1980 | Barash et al. ................. 239/68 |
| 4,350,293 A | | 9/1982 | Lestradet |
| 4,522,338 A | | 6/1985 | Williams |
| 4,637,547 A | * | 1/1987 | Hiniker et al. ................. 239/69 |
| 4,747,540 A | * | 5/1988 | Meyer ......................... 239/76 |
| 4,899,783 A | * | 2/1990 | Yusko, Jr. et al. .............. 251/7 |
| 5,048,755 A | * | 9/1991 | Dodds ......................... 239/68 |
| 5,246,164 A | | 9/1993 | McCann et al. |
| 5,908,157 A | | 6/1999 | Antonellis et al. |

FOREIGN PATENT DOCUMENTS

| | | |
|---|---|---|
| DE | 29908919 | 8/1999 |
| GB | 2118011 | 10/1983 |
| GB | 2162289 | 1/1986 |

* cited by examiner

Primary Examiner—Dinh Q. Nguyen
(74) Attorney, Agent, or Firm—Notaro & Michalos P.C.

(57) ABSTRACT

An apparatus for watering plants has a movable beam carrying several valves for dispersing water. At least some of the valves include a mechanism for sensing water flow and a regulator for adjusting the degree of opening of the valve until the actual flow corresponds to a selected flow value which is determined by a central control unit.

5 Claims, 4 Drawing Sheets

APPARATUS FOR WATERING SURFACES

FIELD AND BACKGROUND OF THE INVENTION

The present invention relates to an apparatus for watering surfaces, in particular plants, with at least one moveable beam on which are arranged several valves for dispensing water, the degree of opening of which can be adjusted continuously.

Such apparatuses are used in particular for watering plants, mainly on large-area flat surfaces, and the moveable beam can rotate around a central point of rotation or move in a linear manner. There are also hybrid forms in which the beam firstly moves in a linear manner, then changes to a rotary motion, and lastly moves in a linear manner again. With all these apparatuses for watering plants, it is important to apply a correctly metered amount of water to the ground. It is already known in this context to use valves whose flow is continuously adjustable (variable proportional valve) in contrast to on-off valves that can just be opened.

SUMMARY OF THE INVENTION

The object of the invention is to improve an apparatus of the type described hereinabove to the extent that the amount of water dispensed by the individual valves can be determined in a precisely metered manner.

According to the invention, this is solved in that at least some of the valves are each provided with means for direct or indirect sensing of an actual flow value, and an electronic regulating means that regulates the degree of opening of the valve until the actual flow value corresponds to a reference flow value pre-determined by a central control means.

Thus it is not simply a case of transmitting an adjustment value for the valve member to the valves, as with decreasing pressure conditions in the water supply line for the different nozzles and the initial positioning of the valve member, this would lead to less exact flow control. Instead, the flow is regulated at the site of the valve, in that an actual flow value is detected and the valve member adjusts the degree of opening of the valve by means of an integrated electronic regulating means until the reference flow value pre-determined by the central control means is actually obtained. As with a known outlet nozzle size and with a known ambient pressure, the flow is a direct function of the pressure after the valve member or respectively in front of the outlet nozzle, there is an advantageous possibility that the flow regulation in the valve can take place by means of pressure regulation, wherein a unit converts the reference flow value, by means of further parameters such as the diameter of an outlet nozzle and/or the external air pressure, into a reference pressure value, and the regulating means adjusts the degree of opening of the valve until the actual pressure value detected by the pressure sensor corresponds to the reference pressure value calculated.

A sturdy valve that has no sealing problems is characterised in that it is provided with an elastic hose, wherein a valve member acting externally upon the hose compresses it and the flow is adjustable by means of the variable pinch point thus formed in the interior of the hose.

Further advantages of the details of the invention will be explained in more detail with reference to the following description of the drawings.

DETAILED DESCRIPTION OF THE PREFERRED EMBODIMENT

Figure 1:
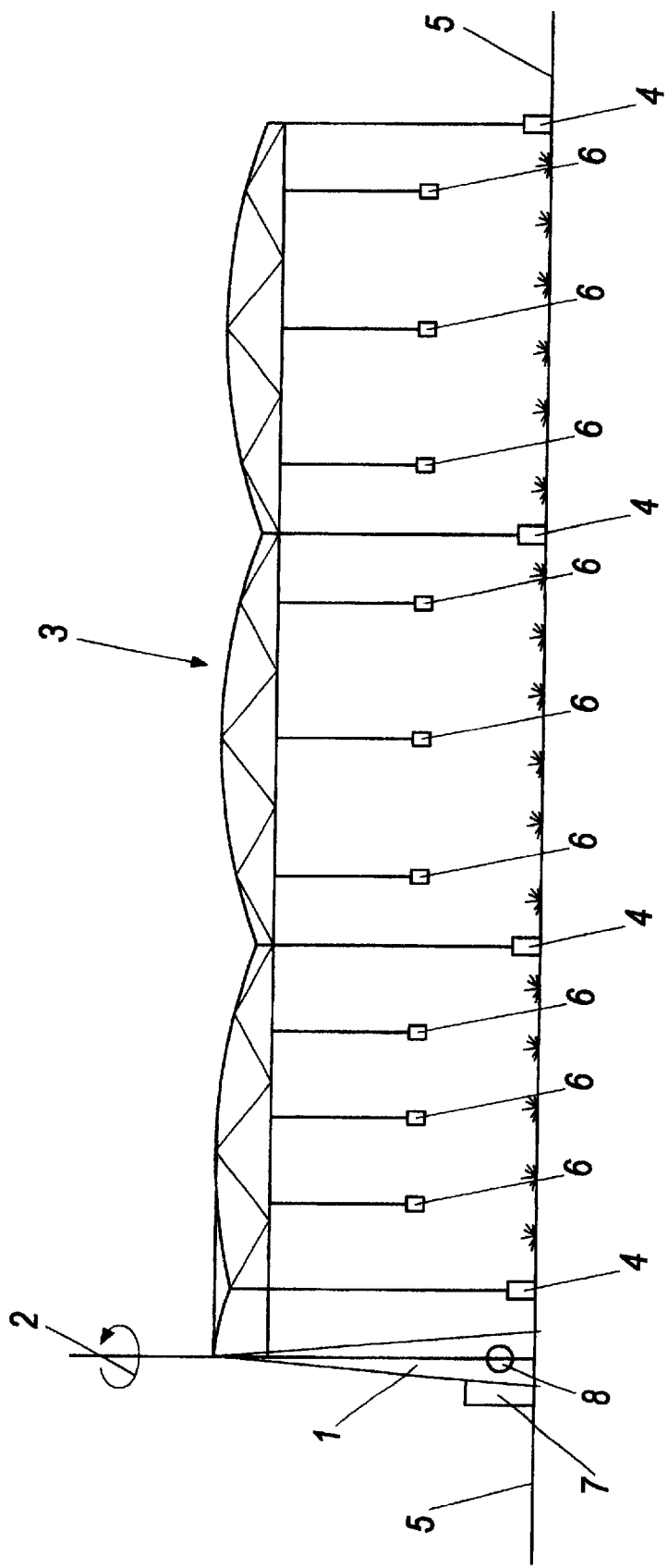
FIG. 1 shows in a schematic view from the side, an embodiment of an apparatus according to the invention for watering (sprinkling) plants.

The apparatus shown in FIG. 1 for watering plants is provided with a beam 3 (for example, a girder) arranged to rotate in the direction of the arrow 2 mounted on a central post 1. Said beam is supported on rollers 4, which may be driven in order to allow rotary motion about the central post 1. The rollers in this case travel on the floor 5. At the ends of a water supply system, valves 6 are provided, which are fitted with nozzles following on from them. The flow of these valves 6 can be adjusted selectively by means of a wiring system, not shown, for example a special bus system, of a central electronic control means 7. The supply of water is via the central water connection 8 and water supply lines in the usual manner.

Figure 2:
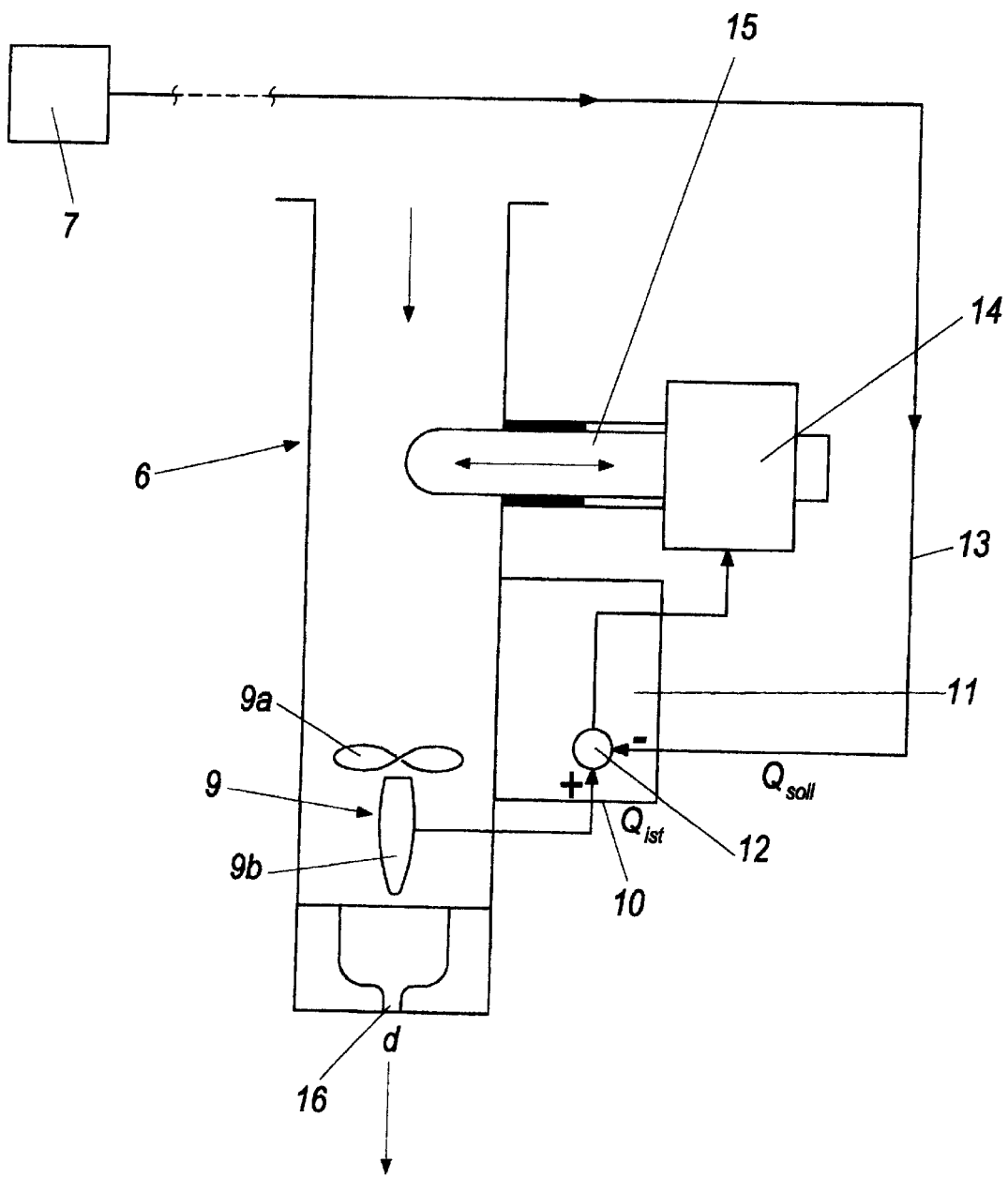
FIG. 2 shows an embodiment of a valve together with regulating means according to the invention.

FIG. 2 shows an embodiment of a valve according to the invention together with regulating means. According to the invention, this valve 6 is provided with an apparatus 9 for direct detection of an actual flow value of the water flowing through. In the embodiment shown, this is a small impeller 9a and a small generator 9b. The impeller rotates at different speeds according to the flow (volume per unit time), and provides a signal via the generator to the line 10, which signal is proportional to or at least a function of the actual flow value $Q_{ist}$.

According to the invention, the valve 6 further has an electronic regulating means 11, wherein the actual regulator 12 compares the actual flow value detected with a reference flow value pre-determined by a central control unit 7 and provided via a wiring system, for example a bus system 13. Depending on these initial values, the regulator then switches on the displacing motor 14 for the member 15 that is configured in a plate-like manner, and restricts the small diameter of the valve until the actual flow value corresponds to the pre-determined reference flow value. This is thus a sub-regulator, integrated into the valve, that ensures that the reference flow value pre-determined by the electronic control means is actually maintained and is independent of all external influences.

In the embodiment shown in FIG. 2, the water exits via an outlet nozzle 16 with diameter d.

FIG. 2 is to be understood as a schematic drawing. The electronic regulating means 11 can naturally be arranged directly on or respectively in the housing of the valve 6 to save space. The plate-like valve member 15 is to be understood as only a schematic representation. Clearly, it can be differently configured to obtain a compact design. Naturally, valve members other than plate-like valve members are perfectly conceivable and possible. It is advantageous when the electronic regulating means and the plate control are assembled with the remaining components of the valve to form a compact, replaceable valve.

Figure 3:
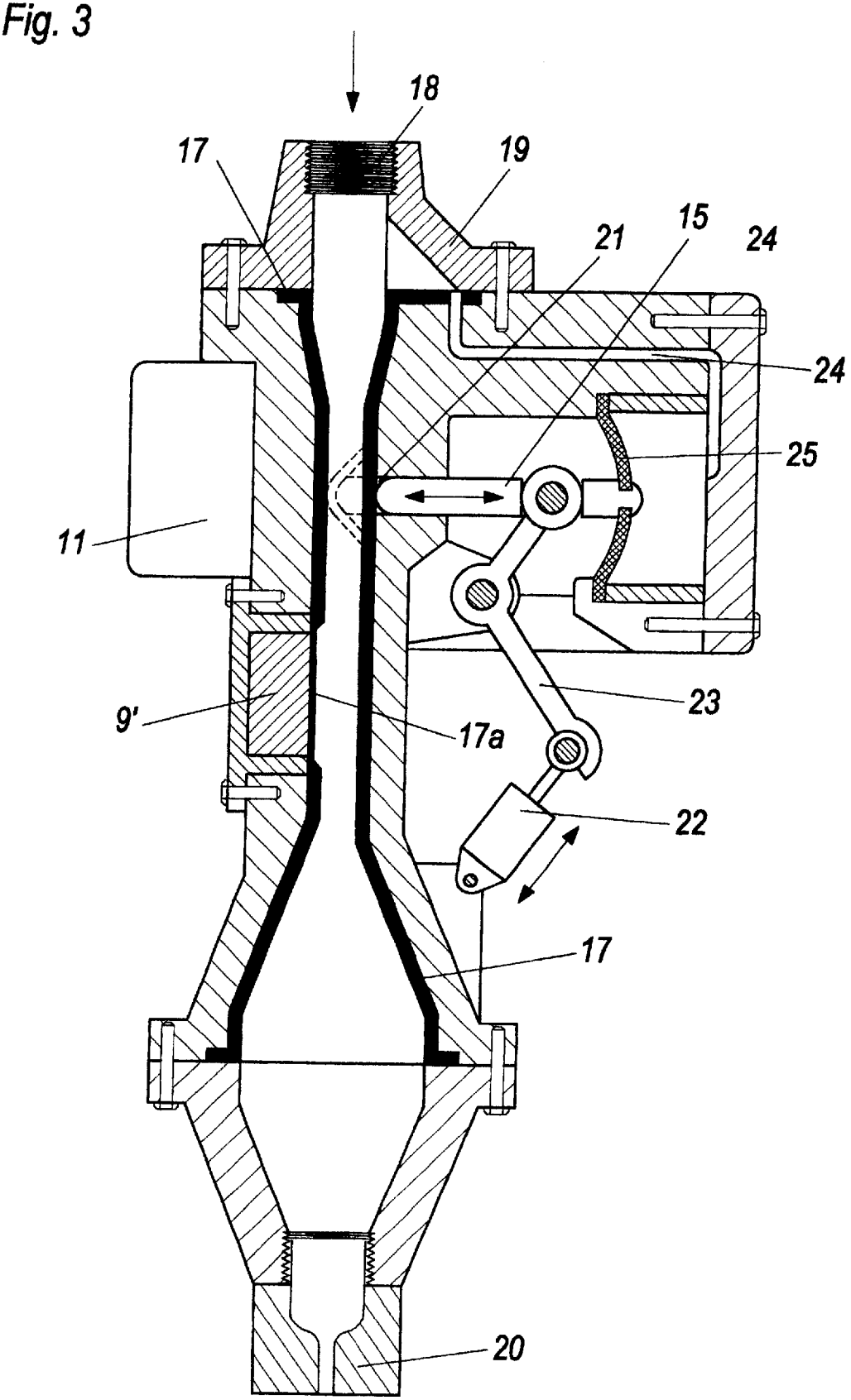
FIG. 3 shows a second embodiment of such a valve.

In the embodiment shown in FIG. 3, flow regulation is done indirectly by means of pressure measurement. The valve shown in FIG. 3 is a so-called hose valve, in which a sealed, flexible hose 17 is provided internally. This hose 17 is provided between the entry point 18 with a connector 19 and the outlet nozzle body 20 with the outlet nozzle 16 (diameter d). All the previous sealing problems are avoided by means of this hose. The valve member 15 presses, at the point 21, externally on the hose, and, as shown in broken lines, can press it inwards, whereby the flow is reduced. A preferably electric drive 22 is provided for driving the valve member 15, which drive acts upon the valve member by means of a lever rod 23. In order to support the movement of the valve member, there are provided a pressure equalizing line 24 and a membrane 25, so that the valve member 15 is easily moveable. For regulation, in accordance with the invention, of the valve, a pressure sensor 9' is provided, which is arranged on a point 17a of the hose that has a reduced wall thickness in order to make possible precise transmission of pressure of the internal water pressure to the pressure sensor 9'. The pressure sensor 9' is connected to the adjustment means 11. The adjustment means 11 is again directly attached to the housing of the valve. The circuitry can then be configured as represented in FIG. 4.

Figure 4:
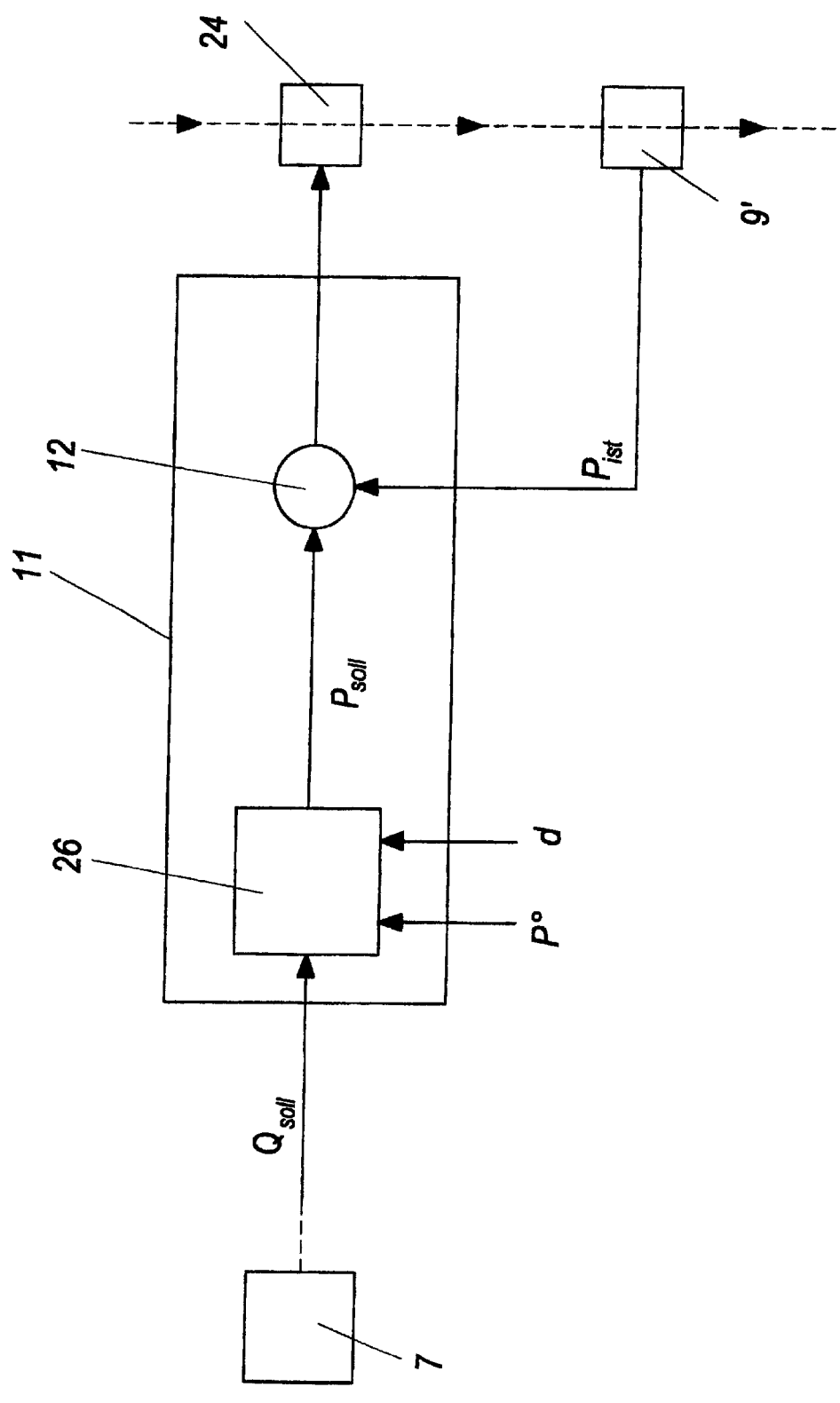
FIG. 4 shows an adjustment means for a valve according to FIG. 3.

In the regulating means shown in FIG. 4, flow regulation is done in the valve 6 indirectly by means of pressure regulation. In addition, the reference flow value $Q_{soll}$ predetermined by the central control unit 7 is firstly calculated with additional help from external parameters such as the air pressure $p_o$ and diameter of the outlet nozzle 16 ($d$). This is done in the computer 26 which continually determines a reference pressure value $p_{soll}$ from the reference flow value $Q_{soll}$. The actual regulator unit 12 now adjusts the plate 15, not shown here, by means of the motor 22 until the actual pressure value ($p_{ist}$) detected by the pressure sensor 9' corresponds to the reference pressure value ($p_{soll}$). Flow regulation can be obtained in a simple and elegant manner by means of such pressure regulation. The outlet diameter of the outlet nozzle has just to be known. This is easily possible in accordance with the invention, as the outlet nozzles for all the valves, or respectively for large groups of valves can be constant and equal.

With the apparatus according to the invention, any water distribution quantity profile can be set up over the length of the beam, which profile can also be changed over time during operation.

Clearly, the invention can be employed with valves other than the valves used. The sprinkler system does not have to be a rotating sprinkler system, but instead beams that can be moved in a linear manner or in a linear and rotary manner can be provided. Moreover, it is perfectly conceivable to connect more than one outlet nozzle, that is to say a group of nozzles, to a valve, so that the outlet nozzles of one group can be controlled via one valve.

What is claimed is:

1. Apparatus for watering plants, with at least one moveable beam, on which are arranged several valves for dispensing water, the degree of opening of which can be adjusted continuously, wherein at least some of the valves each are provided with means (9, 9') for direct or indirect sensing an actual flow value ($Q_{ist}$) and an electronic regulating means that adjusts degree of opening of the valve (6) until the actual flow value ($Q_{ist}$) corresponds to a reference flow value ($Q_{soll}$) predetermined by a central control means (7), wherein the apparatus for watering plants is provided with a pressure sensor (9') which detects the meter pressure following the point of restriction formed by a valve member (15) and the apparatus for water plants calculates the flow preferably from a measured water pressure ($P_{ist}$) and the known diameter (d) of an outlet nozzle (16) connected thereafter.

2. Apparatus according to claim 1, characterised in that the apparatus for watering plants and the electronic regulating means (11) are arranged or respectively fastened in or respectively directly onto the housing of the respective valve (6).

3. Apparatus according to claim 1, characterised in that the regulation of the flow in the valve takes place indirectly by means of pressure regulation, where a unit (26) converts the reference flow value ($Q_{soll}$), using further parameters, such as the diameter (d) of an the outlet nozzle and/or the external air pressure (p), into a reference pressure value ($P_{soll}$), and the regulating means (12) adjusts the degree of opening of the valve (16) until the actual pressure value ($P_{ist}$) detected by the pressure sensor (9') corresponds to the reference pressure value ($P_{soll}$) calculated.

4. Apparatus according to claim 1, characterised in that at least some of the valves (6) are provided with an elastic hose (17), wherein a valve member (15) acting externally upon the hose compresses it and the flow is adjustable by means of the variable pinch point thus formed in the interior of the hose.

5. Apparatus according to claim 1, characterised in that several outlet nozzles (16) are connected to one valve (6).

* * * * *